(12) United States Patent
Fukuda

(10) Patent No.: US 7,859,608 B2
(45) Date of Patent: *Dec. 28, 2010

(54) LIQUID CRYSTAL DISPLAY APPARATUS COMPRISING A FIRST FRAME MADE OF RESIN, A SECOND FRAME MADE OF METAL, AND A BACKBOARD MEMBER MADE OF METAL

(75) Inventor: Yutaka Fukuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 387 days.

This patent is subject to a terminal disclaimer.

(21) Appl. No.: 11/451,662

(22) Filed: Jun. 13, 2006

(65) Prior Publication Data

US 2006/0284808 A1  Dec. 21, 2006

(30) Foreign Application Priority Data

Jun. 20, 2005 (JP) .............................. 2005-179354

(51) Int. Cl.
*G02F 1/1333* (2006.01)

(52) U.S. Cl. ............................... 349/58; 349/59; 349/60

(58) Field of Classification Search ............... 349/58–60
See application file for complete search history.

(56) References Cited

U.S. PATENT DOCUMENTS

| | | | | |
|---|---|---|---|---|
| 5,889,623 | A * | 3/1999 | Ueda et al. | 359/819 |
| 6,747,713 | B1 * | 6/2004 | Sato | 349/58 |
| 6,816,213 | B2 * | 11/2004 | Kato et al. | 349/58 |
| 6,992,734 | B1 * | 1/2006 | Morishita et al. | 349/58 |
| 7,050,128 | B2 * | 5/2006 | Lee et al. | 349/58 |
| 2004/0114372 | A1 * | 6/2004 | Han et al. | 362/330 |
| 2004/0189889 | A1 * | 9/2004 | Nitto et al. | 349/58 |
| 2006/0023141 | A1 * | 2/2006 | Oka | 349/58 |
| 2006/0290835 | A1 * | 12/2006 | Sakuma | 349/58 |

FOREIGN PATENT DOCUMENTS

| | | |
|---|---|---|
| JP | 10-68932 | 3/1998 |
| JP | 11-190835 | 7/1999 |
| JP | 11190835 A * | 7/1999 |
| JP | 2000-19508 | 1/2000 |
| JP | 2002-268566 | 9/2002 |

(Continued)

OTHER PUBLICATIONS

Japanese Office Action for Japanese Application No. 2005-179354, Publication date May 30, 2007, with English translation thereof (7 pages).

(Continued)

*Primary Examiner*—Andrew Schechter
*Assistant Examiner*—Charles Chang
(74) *Attorney, Agent, or Firm*—Osha • Liang LLP

(57) ABSTRACT

On both sides of a resin-made frame, a metallic edge frame member that surrounds a liquid crystal panel and a metallic backboard member equipped with a circuit board are disposed, and these are screw-fitted to the frame. Screw-fitting points are provided as four points in corner portions, and by screws of these respective screw-fitting points, earth circuits that make the edge frame member electrically conductive to the backboard member are formed.

3 Claims, 7 Drawing Sheets

FOREIGN PATENT DOCUMENTS

JP         2004-29663         1/2004

OTHER PUBLICATIONS esp@cenet patent abtract for Japanese Publication No. 10-068932, Publication date Mar. 10, 1998 (1 page).

esp@cenet patent abstract for Japanese Publication No. 2000-019508, Publication date Jan. 21, 2000 (1 page).

esp@cenet patent abstract for Japanese Publication No. 11-190835, Publication date Jul. 13, 1999 (1 page).

Patent Abstracts of Japan, Publication No. 2002-268566, Publication Date Sep. 20, 2002, 1 page.

English Patent Abstract of JP2002268566 from esp@cenet database, 1 page.

Patent Abstracts of Japan, Publication No. 2004-029663, Publication Date Jan. 29, 2004, 1 page.

English Patent Abstract of JP2004029663 from esp@cenet database, 1 page.

* cited by examiner

RELATED ART

RELATED ART

LIQUID CRYSTAL DISPLAY APPARATUS COMPRISING A FIRST FRAME MADE OF RESIN, A SECOND FRAME MADE OF METAL, AND A BACKBOARD MEMBER MADE OF METAL

CROSS-REFERENCE TO RELATED APPLICATIONS

This application is based on and claims the benefit of priority from the prior Japanese Patent Application No. 2005-179354, filed on Jun. 20, 2006; the entire contents of which are incorporated herein by reference.

TECHNICAL FIELD

The present invention relates to a liquid crystal display apparatus employed in, for example, a television receiver and particularly, to a liquid crystal display apparatus for which a measure for preventing static electricity of a human body from exerting an adverse effect on a liquid crystal panel, a control circuit board, and the like has been taken by making a metallic edge frame member called a bezel disposed around a liquid crystal panel electrically conductive to a metallic backboard member called a rear frame disposed behind the liquid crystal panel.

BACKGROUND

Description of Related Art

Conventionally, with regard to a display panel module into which an LCD (liquid crystal display) is incorporated, it has been known, in order to suppress electromagnetic waves radiated from the LCD panel module, to arrange a conductive sheet behind the LCD panel incorporated into a bezel and obstruct a loop antenna function owing to the bezel by making the conductive sheet electrically conductive to the bezel (see JP-A-2002-268566, for example). In addition, with regard to a direct-backlight liquid crystal display apparatus suitable for a large screen, a technique for discharging a high-frequency noise charge by making a rear chassis housing a fluorescent lamp as a backlight and a reflector and a bezel fixing a liquid crystal display panel electrically conductive to each other by a metallic intermediate frame disposed therebetween and grounding the bezel or rear chassis to a ground potential has also been proposed (see JP-A-2004-29663, for example).

Meanwhile, FIG. 6 is schematic exploded perspective view of a main part of a liquid crystal display apparatus according to a reference example. This liquid crystal display apparatus is disposed with, in a manner sandwiching a frame 1 made of a roughly rectangular loop-shaped resin molding, on both sides thereof, a metallic edge frame member (bezel) 6 that surrounds a liquid crystal panel (liquid crystal cells) 5 for a television receiver and sandwiches the liquid crystal panel 5 with the frame 1 and a backboard member (rear frame) 8 formed with a sheet metal thicker than the edge frame member 6, and on an outer surface side of the backboard member 8, a circuit board (unillustrated) used for, for example, driving the liquid crystal panel is mounted. And, the edge frame member 6 is fixed to the frame 1 by use of screws 3 at a plurality of points, and the backboard member 8 is likewise fixed to the frame 1 by use of unillustrated screws at a plurality of points. Also, in FIG. 6, reference numeral 9 denotes a relay board that is long sideways, and the relay board 9 is required for connecting the circuit board mounted on the backboard member 8 to electrodes of the liquid crystal panel 5, and is disposed along one side of the backboard member 8, specifically, an upper side portion.

In the liquid crystal display apparatus having the above construction, it has been known that, as a measure for preventing static electricity of a human body from jumping there into to exert an adverse effect on the liquid crystal panel 5, it is helpful to utilize the edge frame 6 that fixes the liquid crystal panel 5 to the frame 1.

Therefore, an earth fitting 100 is used to collect static electricity of the human body by the edge frame member 6, release the same to the backboard member 8, and further release the same from the backboard member 8 to an earth pattern of the circuit board mounted thereon. The earth fitting 100 is formed by bending a sheet metal into a complex shape as in FIG. 7, one end portion thereof 110 is concurrently clamped onto the edge frame member 6 by use of one of the screws 3, and the other end portion 120 is joined to the backboard member 8 by means of a screw 4 as shown in FIG. 6.

In the liquid crystal display apparatus with this construction, the edge frame member 6 is useful for preventing, when static electricity of a human body has jumped into an installation site of said liquid crystal display device, exertion of an adverse effect on the liquid crystal panel 5 and circuit board by conducting the static electricity. Namely, when static electricity of a human body has jumped into an installation site of said liquid crystal display apparatus, the static electricity flows through an AC power cord after being conducted to the edge frame member 6, earth fitting 100, backboard member 8, and circuit board in this order, and is released to the ground side.

SUMMARY OF INVENTION

However, according to the reference example described with reference to FIG. 6, even though the earth fitting 100 has been concurrently clamped onto the edge frame member 6 with the screw 3 for fixing the edge frame member 6 to the frame 1, the earth fitting 100 in a complex shape and the screw 4 that joins the earth fitting 100 to the backboard member 8 are necessary. Consequently, since the earth fitting and screws for mounting the same have been required as extra, the number of assembling steps and the number of required components have been increased to be an obstacle to cost reduction.

The present invention has been made in view of the above circumstances, and it is an object thereof to provide a liquid display unit that can prevent exerting an adverse effect on a liquid crystal panel and a circuit board by making it possible, when static electricity of a human body has jumped thereinto, to lead the static electricity from an edge frame member to a backboard member regardless of being able to eliminate the necessity of use of an earth fitting and screws for mounting the earth fitting as extra.

In addition, it is an object of the present invention to provide a liquid crystal display apparatus can make it possible to form earth circuits that make an edge frame member electrically conductive to a backboard member by screws and utilize the screws for enhancing mounting strength of an edge frame member and a backboard member onto a frame.

Furthermore, it is an object of the present invention to provide a liquid crystal display apparatus that can effectively prevent an effect of static electricity on, particularly, an approximately 20-inch large-sized liquid crystal panel and a circuit board thereof without increasing the number of required components.

According to an aspect of the invention, a liquid crystal display apparatus comprises; a frame made of resin, the frame having a circular and rectangular shape, the frame having a flange extending across four side positions and through holes; a metallic edge frame surrounding a liquid crystal panel for a television receiver, the metallic edge frame sandwiching the liquid crystal panel with the frame, and a metallic backboard member equipped with a circuit board, the metallic backboard member capable of being screw-fitted to the frame. First mounting pieces having screw insertion holes are provided with both sides in one opposite side direction of the metallic edge frame member, respectively. Second mounting pieces having screw holes provided with both sides in one opposite side direction of the metallic backboard member, respectively. The first mounting pieces and the second mounting pieces are fastened to the flange of the flame with headed screws inserted through the through-holes of the flange, so that the first and second mounting pieces and the headed screws form an earth conductive path which makes the metallic edge frame member electrically conductive to the metallic backboard member. The fastening points are positioned in vicinities of four corner portions of the frame.

With this construction, when static electricity of a human body has jumped into an installation site of said liquid crystal display apparatus, since the static electricity flows to the edge frame member, and then is released to the backboard member through the earth circuits formed by the first and second mounting pieces and screws, it becomes possible to prevent an adverse effect owing to the static electricity being exerted on the liquid crystal panel. Accordingly, it becomes unnecessary to use the earth fitting 100 and screws for mounting the same described in terms of FIG. 6 and FIG. 7. In addition, since the joining points between the first mounting piece and second mounting piece by the screws forming the earth circuits are positioned at respective points in the vicinities of four corner portions of the above-described frame 4, the roughly rectangular edge frame member and backboard member are joined to the frame at the four points in the vicinities of the respective corner portions around the same, which makes it possible to secure mounting strength onto the frame required for the edge frame member and backboard member sufficiently great, and the static electricity that has flowed to the edge frame member is dispersed to the four respective points around the same and is released to the backboard member, which is useful to prevent secondary emission of the static electricity from the edge frame member.

It is possible to employ a construction that screw insertion holes are opened in one side of the first mounting pieces and the second mounting pieces, screw holes are formed on the other side, and the screws made of headed screws inserted through the screw insertion holes and through-holes are screwed into the screw holes at overlapping points between these respective mounting pieces and flange, and according thereto, there is an advantage such that the screws forming the earth circuits are low in cost since these are general-purpose screws.

It is possible to employ a construction that the edge frame member is joined to the flange only at the joining points between the first mounting piece and second mounting piece by the screws forming the earth circuits, whereas for the backboard member, projection pieces are provided consecutively to both sides in another opposite side direction thereof, respectively, and these projection pieces are overlapped with the flange on both sides in another opposite side direction of the frame, and according thereto, the relatively light-weighted edge frame member is screw-fitted to the frame only with the screws forming the earth circuits, whereas the projection pieces of the backboard member thicker and weighted heavier than the edge frame member overlap with the flange of the frame to serve to reinforce the flange.

According to another aspect of the invention, the projection pieces may be screw-fitted to the flange. Since the backboard member thicker and weighted heavier than the edge frame member is fixed to the frame also at the points other than the earth circuit forming points, mounting strength of the backboard member is improved by that much.

According to another aspect of the invention, a liquid crystal display apparatus includes: a frame made of resin, the frame having a circular and rectangular shape, the frame having a flange extending across four side positions, and the frame having through holes; a metallic edge frame surrounding a liquid crystal panel for a television receiver, the metallic edge frame sandwiching the liquid crystal panel with the frame, and a metallic backboard member made thicker than the metallic edge frame and equipped with a circuit board, the metallic backboard member capable of being screw-fitted to the frame. The metallic edge frame member and the metallic backboard member are made electrically conductive by an earth fitting which is individually screw-fitted thereto. First mounting pieces having screw insertion holes are provided with both sides in one opposite side direction of the metallic edge frame member, respectively. Second mounting pieces having screw holes provided with both sides in one opposite side direction of the metallic backboard member, respectively. The first mounting pieces and the second mounting pieces are fastened to the flange of the flame with headed screws inserted through the screw insertion holes of the first mounting pieces and the through-holes of the flange and the screw holes of the second mounting pieces, instead of omitting both the earth fitting and a mounting screw fitting the earth fitting to the metallic edge frame member and the metallic backboard member, so that the first and second mounting pieces and the headed screws form an earth conductive path which makes the metallic edge frame member electrically conductive to the metallic backboard member, wherein the fastening points are formed between the first mounting piece and the second mounting piece by the screws forming the earth conductive path. The fastening points are positioned in vicinities of four corner portions of the frame. The metallic edge frame member is fastened and jointed to the flange only at the fastening points. The metallic backboard member has projection pieces which is provided consecutively to both sides in the other opposite side direction thereof, respectively. The projection pieces are at least partially overlapped with the flange on both sides in the other opposite side direction of the frame. The projection pieces on one side of the both sides in the other opposite side direction of the frame are screw-fitted to the flange.

According to the above-aspects, since earth circuits are formed by only fastening and fixing the first mounting pieces provided on the edge frame member and second mounting pieces provided on the backboard member to the flange of the frame with the screws, and it becomes possible to release static electricity flowed to the edge frame member via the earth circuits, therefore, even when the earth fitting and screws for mounting the same described in terms of FIG. 6 are omitted, an adverse effect owing to static electricity is hardly exerted onto the liquid crystal panel and circuit board without increasing the required number of screws. Accordingly, it becomes possible not only to provide a liquid crystal display panel at low cost but also, for a user, to use the same without feeling worried about static electricity of the user him/herself exerting an adverse effect on the liquid crystal panel.

DESCRIPTION OF THE EMBODIMENTS

Figure 1:
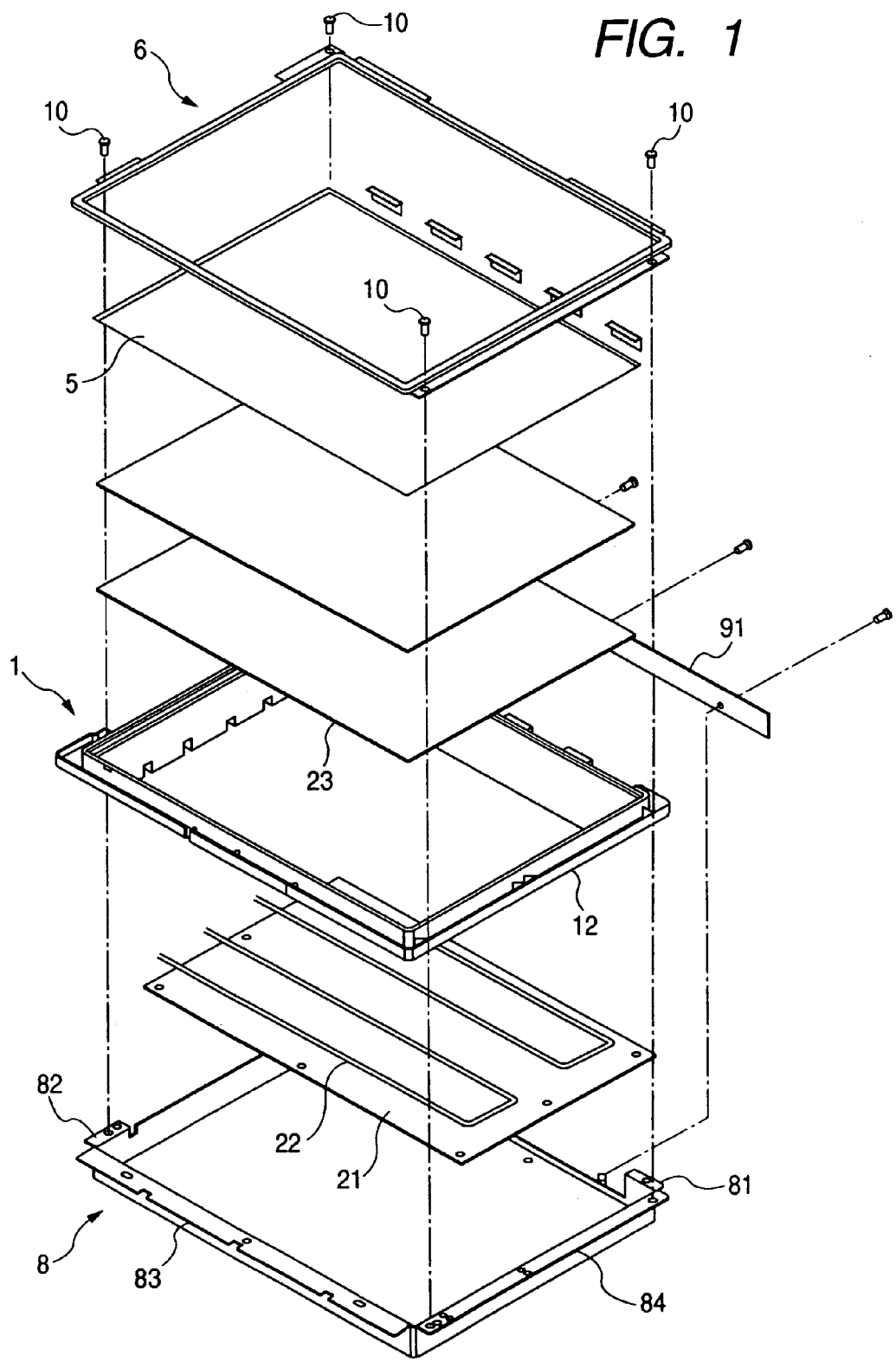
FIG. 1 is a schematic exploded perspective view of a main part of a liquid crystal display apparatus according to an embodiment.
Figure 2:
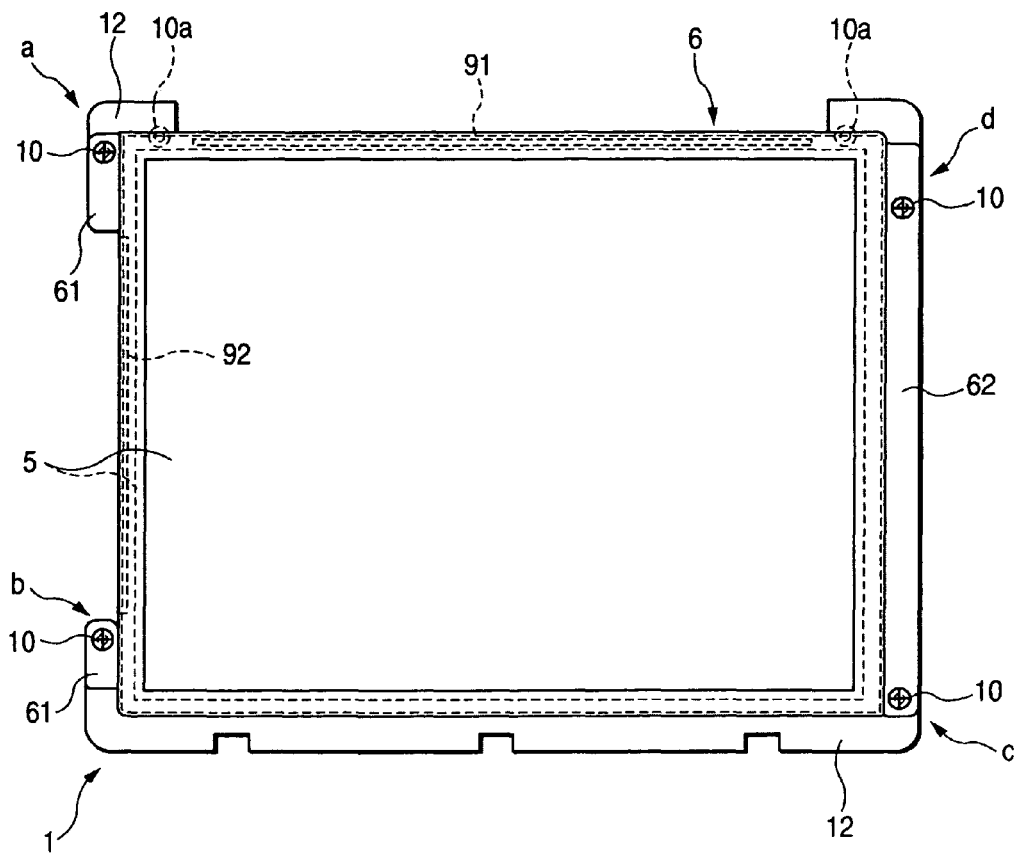
FIG. 2 is a front view of the same liquid crystal display apparatus.
Figure 3:
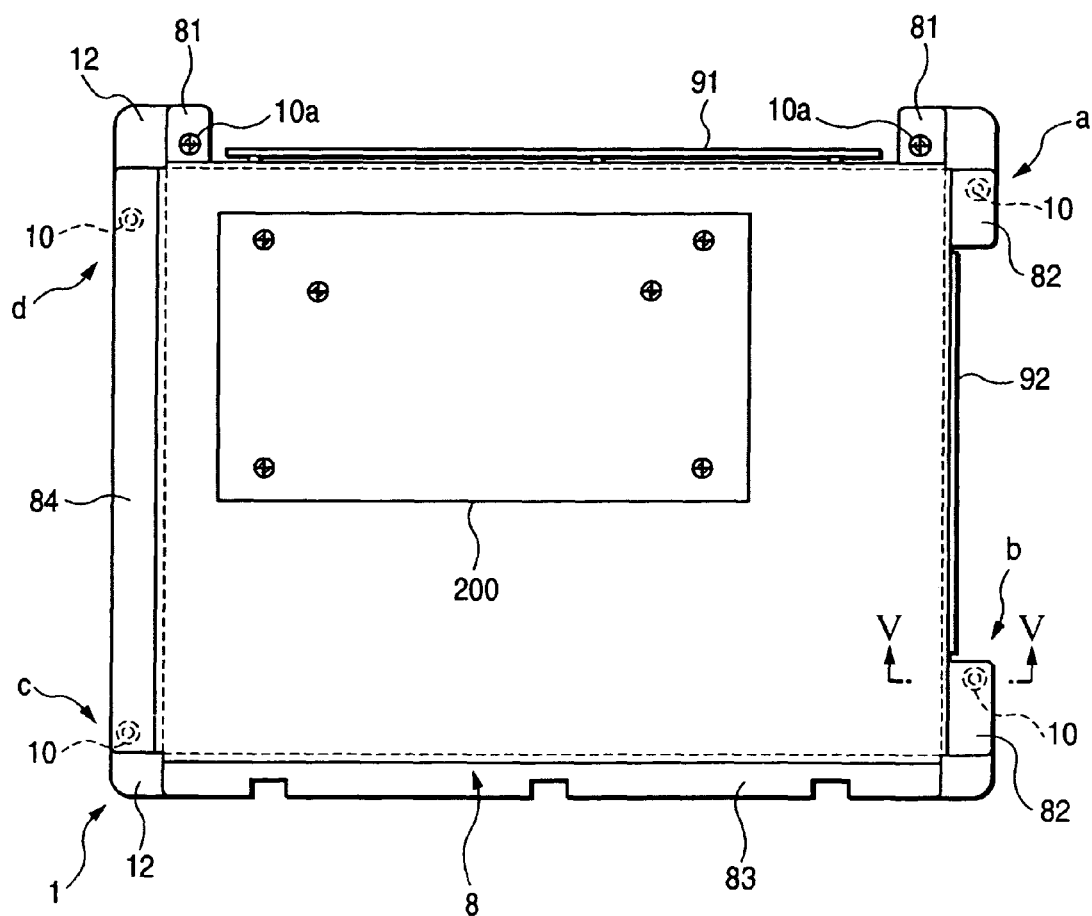
FIG. 3 is a rear view of the same liquid crystal display apparatus.
Figure 4:
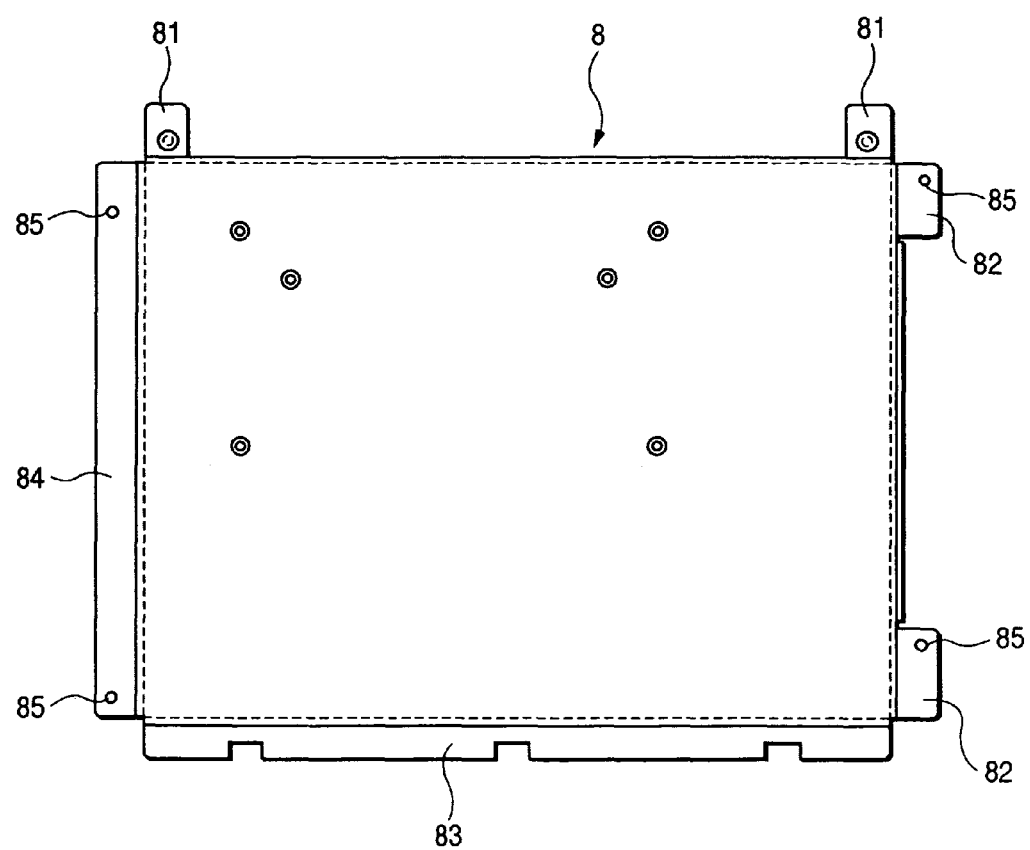
FIG. 4 is a rear view of a backboard member.
Figure 5:
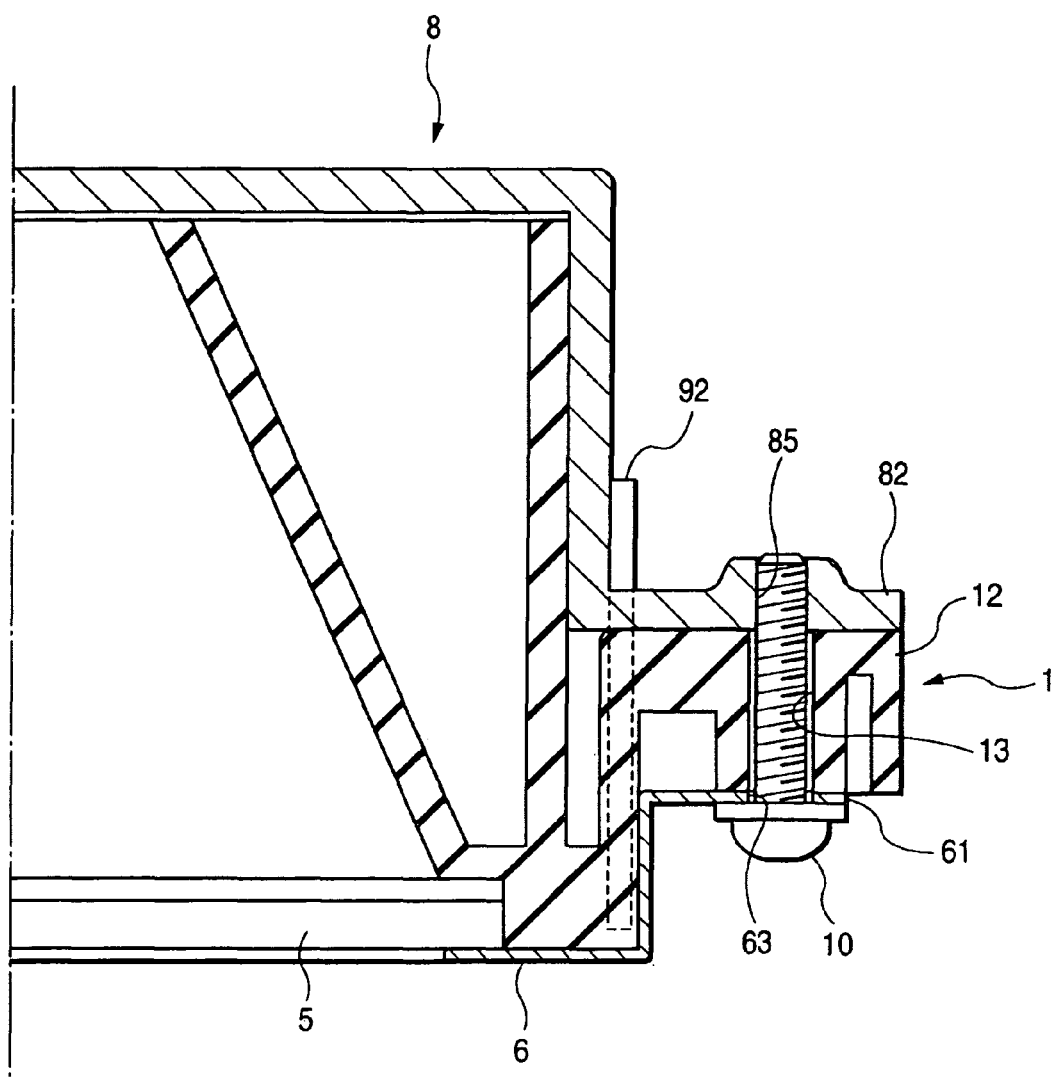
FIG. 5 is an enlarged cross-sectional view of a part along a line V-V of FIG. 3.

FIG. 1 is a schematic exploded perspective view of a main part of a liquid crystal display apparatus according to an embodiment, FIG. 2 is a front view of the same liquid crystal display apparatus, FIG. 3 is a rear view of the same liquid crystal display apparatus, FIG. 4 is a rear view of a backboard member 8, and FIG. 5 is an enlarged cross-sectional view of a part along a line V-V of FIG. 3.

Figure 6:
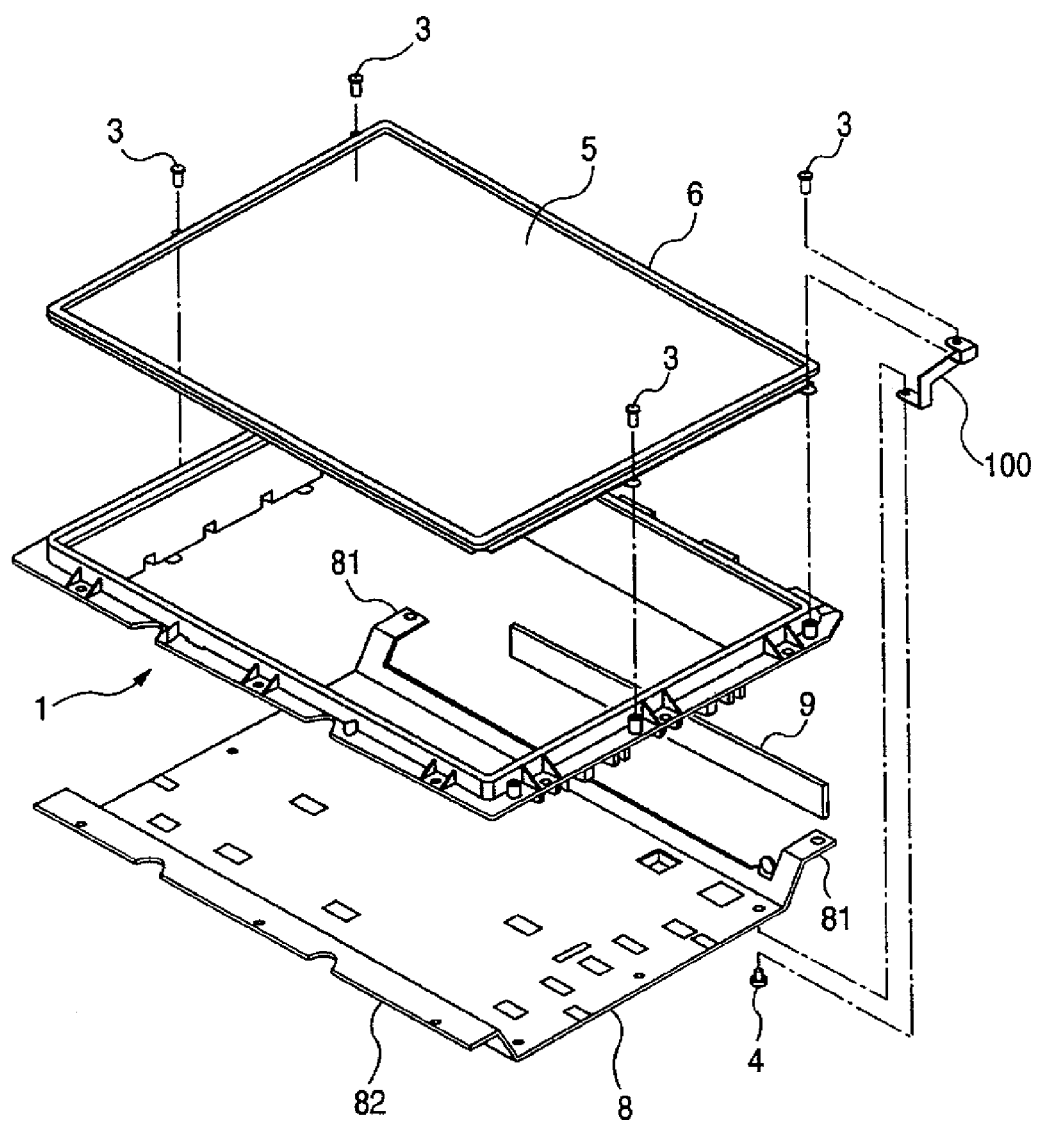
FIG. 6 is a schematic exploded perspective view of a main part of a liquid crystal display apparatus according to a reference example.
Figure 7:
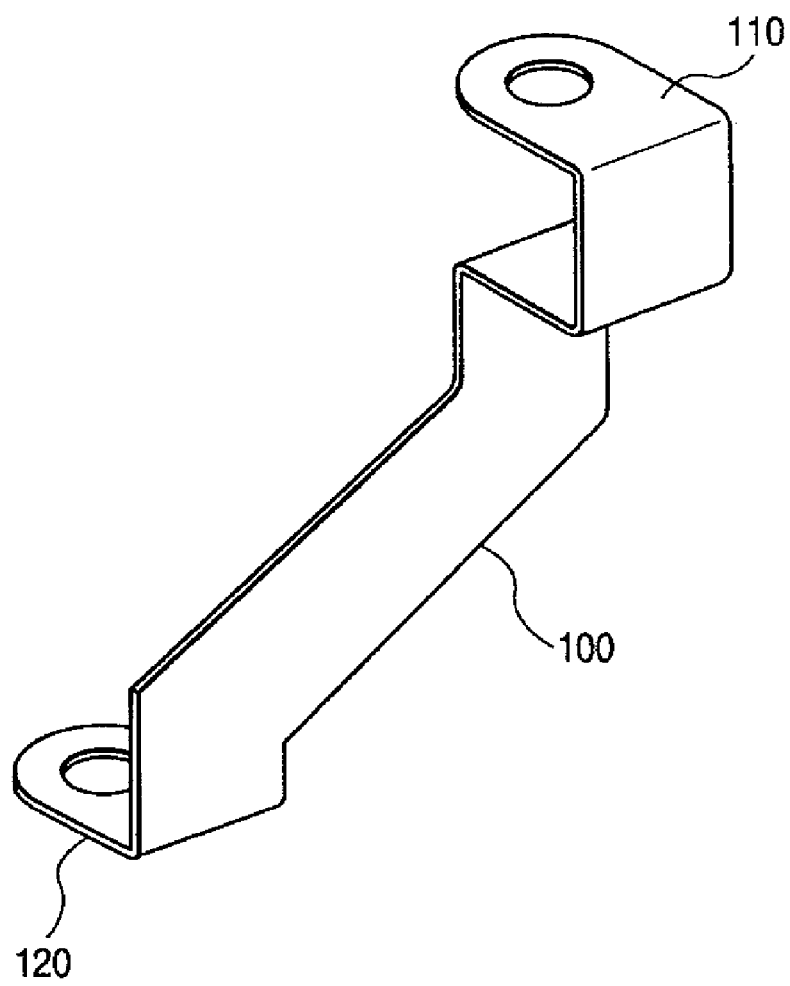
FIG. 7 is an enlarged perspective view of an earth fitting.

The liquid crystal display apparatus according to the embodiment is formed for a television receiver using an approximately 20-inch large-sized liquid crystal panel 5, includes, as in FIG. 1, as main components thereof, a resin-made frame 1 shaped in a roughly loop form, a metallic edge frame member 6, and a metallic backboard 8, and includes, as other components, a reflection sheet 21, a fluorescent tube 22 as a backlight, a light diffusion sheet 23, and the like, however, it does not require an earth fitting 100 and screws 3 and 4 for mounting the same shown in FIG. 6 and FIG. 7.

The frame 1 has a flange 12 that extends across four side portions, and as shown in FIG. 2 and FIG. 3, for an upper side part and a left side part of the flange 12, center parts thereof have been chipped off except for both ends. This frame 1 serves to form a space for housing the fluorescent tube 22 and like as well as overlaps with the liquid crystal panel 5 to serve to reinforce the liquid crystal panel 5.

The edge frame member 6 is shaped in a rectangular loop form, respective side portions of which have L-shaped cross-sectional shapes, fitted into the periphery of the liquid crystal panel 5 placed over the frame 1 to surround the whole of the liquid crystal panel (see FIG. 5), and has first mounting pieces 61 and 62 having screw insertion holes 63 (see FIG. 5) provided consecutively to both left and right sides (both sides in one opposite side direction) of the edge frame member 6, respectively. In the present embodiment, as in FIG. 2, for the first mounting piece 61 at the left side of the edge frame member 6, a longitudinal center portion thereof has been chipped off, whereas the first mounting piece 62 at the right side of the edge frame member 6 extends across the whole-length part of a longitudinal length of the edge frame member 6.

In contrast thereto, the backboard member 8 formed in a roughly rectangular form is fabricated by bending a flat plate member, includes second mounting pieces 82 and 84 having screw holes 85 (see FIG. 4 or FIG. 5) at respective left and right side portions thereof, and includes projection pieces 81 and 83 at an upper side portion and a lower side portion. And, for the second mounting piece 84 at the left side and the projection piece 81 at the upper side portion, center parts thereof have been chipped off except for both ends thereof.

Then, as shown in FIG. 2 and FIG. 3 or FIG. 5, on the left side of the frame 1, the first mounting pieces 61 and 61 at the top and bottom of the edge frame member 6 and the second mounting pieces 82 and 82 of the backboard member 8 are disposed in a manner sandwiching identical points of the flange 12 of the frame 1, and the first mounting pieces 61 and 61 and the second mounting pieces 82 and 82 are fastened to the flange 12 with screws 10 made of headed screws inserted through the screw insertion holes 63 of the first mounting pieces 61 and 61 and through-holes 13 opened in the flange 12 and screwed into the screw holes 85 of the second mounting pieces 82 and are thereby joined to the flange 12. On the right side of the frame 1 as well, the first mounting piece 62 of the edge frame member 6 and the second mounting piece 84 of the backboard member 8 are disposed in a manner sandwiching an identical point of the flange 12 of the frame 1, and the first mounting piece 62 and the second mounting piece 84 are fastened to the flange 12 with screws 10 made of headed screws inserted through screw insertion holes of the first mounting piece 62 and through holes of the flange 12 and screwed into screw holes of the second mounting piece 84 and are thereby joined to the flange 12.

The edge frame member 6 is screw-fitted to the frame 1 only at screw-fitting points a, b, c, and d in the vicinities of four corner portions of the frame 1, whereas for the backboard member 8, in addition to these four points, the projection pieces 81 and 81 at the left and right of the upper side portion are screw-fitted to the flange 12 by use of screws 10a, and the projection piece 83 of the lower side portion 83 is overlapped with the flange 12 at the lower side portion of the frame 1.

The screws 10 that join the edge frame member 6 and backboard member 8 to the frame 1 at the four screw-fitting points a, b, c, and d described above are made of a metal having conductivity, and the first mounting pieces 61 and 62 and the second mounting piece 82 and 84 are also made of metal pieces integrally provided consecutively to the edge frame member 6 and backboard member 8, therefore, by these respective mounting pieces 61, 62, 82, and 84 and the screws 10, earth conductive paths (hereinafter, referred to as "earth circuit") to make the edge frame member 6 electrically conductive to the backboard member 8 are formed at the above-described screw-fitting points a, b, c, and d.

In addition, since the projection pieces 81 and 81 at the upper side portion of the backboard member 8 are screw-fitted to the flange 12, mounting strength of this backboard member 8 onto the frame 1 is secured sufficiently great by the four screw-fitting points a, b, c, and d and two screw-fitting points of the upper side portion described above, and furthermore, since the projection pieces 83 at the lower side portion of the backboard member 8 are overlapped with the flange 12, the frame 1 having the flange 12 is reinforced. Accordingly, even in the liquid crystal display apparatus using an approximately 20-inch large-sized liquid crystal panel 5, strength of the liquid crystal panel 5 is secured sufficiently great.

As in FIG. 3, on the outer surface side of the backboard member 8, a control circuit board 200 for driving the above-described liquid crystal panel 5 is mounted, and the circuit board 200 and electrodes (unillustrated) arranged at the upper end and side ends of the liquid crystal panel 5 are connected via a relay board 91 long sideways installed in a space between the left and right mounting pieces 81 and 81 at the upper side portion of the backboard member 8 and a relay board 92 longer than is wide installed in a space between the second mounting pieces 82 and 82 at the left side of the backboard member 8. As such, since it is necessary for the backboard member 8 to have been provided with rigidity sufficiently great to secure mounting strength of the circuit board 200 and the like, the backboard member 8 is fabricated with a flat plate material thicker than the above-described edge frame member 6. And, since the screw holes 85 into which the screws 10 are screwed and tightened are formed on the second mounting pieces 82 and 84 provided consecutively to such a thick-walled backboard member 8, a sufficient tightening force is obtained by the screws 10, thus the edge frame member 6 and backboard member 8 are tightly mounted on the flange 12.

According to the liquid crystal display apparatus constructed as in the above, static electricity of a human body that has jumped into an installation site of said liquid crystal display apparatus flows to the edge frame member 6 without exerting an adverse effect on the liquid crystal panel 5, circuit board 200, relay boards 91 and 92, and the like, is released to the backboard member 8 through the earth circuits, and is further released from the backboard member 8 to the ground side through an earth pattern of the circuit board 200. Accordingly, although the earth fitting 100 and the screws 3 and 4 for mounting the same described in terms of FIG. 6 and FIG. 7 are omitted, no adverse effect owing to the static electricity is exerted on the liquid crystal panel 5, circuit board 200, relay boards 91 and 92, and the like. Particularly, in the present embodiment, since the four points in the vicinities of the corner portions of the edge frame member 6 are screw-fitted and earth circuits are formed at these points, the static electricity is dispersed to the four respective points around the edge frame member 6 and is released to the backboard member 8 through the respective earth circuits, whereby static electricity releasing efficiency is improved so that secondary emission of the static electricity from the edge frame member 6 is prevented.

In the above, although the liquid crystal display apparatus for a television receiver with an approximately 20-inch large-sized liquid crystal panel 5 has been illustrated, as a matter of course, it is possible to apply the same construction as the present embodiment to a liquid crystal display apparatus of a television receiver with a 15-inch relatively small-sized liquid crystal panel and a liquid crystal display apparatus of other audio-video equipment.

In the present embodiment, the edge frame member 6 has been joined to the frame 1 at the four screw-fitting points a, b, c, and d, and the earth circuit has been formed at all of the four points, however, in this regard, it is also possible to determine the earth circuit forming point only on one point of the above-described four points or only on two or three points thereof, for example. In addition, projections formed on the frame 1 may be latched with the frame 1 so as to assist the joint between the edge frame member 6 and frame 1.

What is claimed is:

1. A liquid crystal display apparatus comprising:
   a liquid crystal panel;
   a first frame made of resin;
   a second frame made of metal and sandwiching the liquid crystal panel with the first frame;
   a backboard member made of metal and adapted to mount a circuit board thereon;
   a first flange protruded from a first edge of the first frame in a direction parallel to the liquid crystal panel, the first flange having a first through hole;
   a second flange protruded from a second edge of the first frame which intersects with the first edge in a direction parallel to the liquid crystal panel, the second flange being continuous with the first flange and having a second through hole;
   first mounting pieces protruded from the second frame in a direction parallel to the liquid crystal panel, and having screw insertion holes;
   second mounting pieces protruded from the backboard member in a direction parallel to the liquid crystal panel, and having screw holes;
   screws each of which has a part made of metal, extends in a direction orthogonal to the liquid crystal panel through one of the screw insertion holes and either the first through hole or the second through hole, and is screwed into one of the screw holes, so that the first mounting pieces and the second mounting pieces are fastened to the first flange and the second flange; and
   a relay board electrically connecting the circuit board to the liquid crystal panel and disposed between the second mounting pieces in a direction orthogonal to the liquid crystal panel,
   wherein the second frame is electrically connected to the backboard member by way of the screws and electrically grounded.

2. The liquid crystal display apparatus according to claim 1, wherein the first through hole and the second through hole are located in the vicinity of a corner defined by the first edge and the second edge.

3. The liquid crystal display apparatus according to claim 1, wherein each of the screw holes of the second mounting pieces has a threaded groove so that the screws are fixed to the second mounting pieces by engaging with the threaded groove.

* * * * *